United States Patent
Lo et al.

(10) Patent No.: US 11,178,453 B2
(45) Date of Patent: Nov. 16, 2021

(54) SIGNALING AND REPORTING INTERACTIVITY USAGE IN STREAMING SERVICES

(71) Applicant: QUALCOMM Incorporated, San Diego, CA (US)

(72) Inventors: Charles Nung Lo, San Diego, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/259,109

(22) Filed: Jan. 28, 2019

(65) Prior Publication Data

US 2019/0238937 A1     Aug. 1, 2019

Related U.S. Application Data

(60) Provisional application No. 62/623,384, filed on Jan. 29, 2018.

(51) Int. Cl.
    *H04N 21/442*      (2011.01)
    *H04N 21/437*      (2011.01)
    (Continued)

(52) U.S. Cl.
    CPC ... *H04N 21/44213* (2013.01); *H04L 65/1059* (2013.01); *H04L 65/4076* (2013.01);
    (Continued)

(58) Field of Classification Search
    CPC ....... H04N 21/44213; H04N 21/26258; H04N 21/44204; H04N 21/4722;
    (Continued)

(56) References Cited

U.S. PATENT DOCUMENTS

2003/0196206 A1* 10/2003 Shusman ........... H04N 21/8126
    725/91
2010/0287580 A1* 11/2010 Harding ............. H04N 21/8455
    725/14

(Continued)

OTHER PUBLICATIONS

P. Juluri, V. Tamarapalli and D. Medhi, "Measurement of Quality of Experience of Video-on-Demand Services: A Survey," in IEEE Communications Surveys & Tutorials, vol. 18, No. 1, pp. 401-418, Firstquarter 2016, doi: 10.1109/COMST.2015.2401424. (Year: 2016).*

(Continued)

*Primary Examiner* — Cynthia M Fogg

(74) *Attorney, Agent, or Firm* — Campbell C. Chiang; Shumaker & Sieffert, P.A.

(57) ABSTRACT

An example device for reporting interactivity usage information while presenting streamed media data includes a memory configured to store media data, and a processor implemented in circuitry and configured to execute a streaming client to receive a manifest file indicating reporting expectations representing data to be reported by the streaming client to a reporting server device during a media streaming session, send data representative of the reporting expectations to an interactivity application executed on the client device, receive interactivity usage information from the interactivity application executed on the client device, and report the interactivity usage information to the reporting server device.

36 Claims, 5 Drawing Sheets

(51) Int. Cl.
| | |
|---|---|
| *H04N 21/258* | (2011.01) |
| *H04N 21/4722* | (2011.01) |
| *H04N 21/262* | (2011.01) |
| *H04N 21/845* | (2011.01) |
| *H04L 29/06* | (2006.01) |
| *H04L 29/08* | (2006.01) |

(52) U.S. Cl.
CPC .......... *H04L 65/602* (2013.01); *H04L 65/604* (2013.01); *H04L 65/80* (2013.01); *H04L 67/02* (2013.01); *H04N 21/25866* (2013.01); *H04N 21/26258* (2013.01); *H04N 21/437* (2013.01); *H04N 21/44204* (2013.01); *H04N 21/4722* (2013.01); *H04N 21/8456* (2013.01); *H04L 65/4084* (2013.01)

(58) Field of Classification Search
CPC ........... H04N 21/25866; H04N 21/437; H04N 21/8456; H04N 21/44218; H04N 21/4532; H04N 21/44222; H04N 21/4667; H04N 21/6582; H04N 21/25891; H04L 67/02; H04L 65/80; H04L 65/4084; H04L 65/4076; H04L 65/604; H04L 65/602; H04L 65/1059
USPC ........................................................ 725/9–12
See application file for complete search history.

(56) References Cited

U.S. PATENT DOCUMENTS

| | | | | |
|---|---|---|---|---|
| 2012/0159528 A1* | 6/2012 | Toney, Jr. | .............. | H04H 60/33 725/14 |
| 2012/0324101 A1* | 12/2012 | Pecjack | .............. | G06Q 30/0201 709/224 |
| 2014/0040498 A1* | 2/2014 | Oyman | ................. | H04L 67/303 709/231 |
| 2014/0095670 A1* | 4/2014 | Ozgur | ................... | H04L 1/1861 709/219 |
| 2014/0289000 A1* | 9/2014 | Hutchings | .......... | G06Q 30/0201 705/7.29 |
| 2016/0119395 A1* | 4/2016 | Li | ........................ | H04L 12/189 709/219 |
| 2016/0373324 A1* | 12/2016 | Gholmieh | ............... | H04L 41/50 |
| 2017/0359628 A1* | 12/2017 | Sachdev | ............. | H04N 21/435 |

OTHER PUBLICATIONS

V. K. Adhikari, Y. Guo, F. Hao, V. Hilt and Z. Zhang, "A tale of three CDNs: An active measurement study of Hulu and its CDNs," 2012 Proceedings IEEE Infocom Workshops, 2012, pp. 7-12, doi: 10.1109/INFCOMW.2012.6193524 (Year: 2012).*

3rd Generation Partnership Project; Technical Specification Group Services and System Aspects; (MBMS and PSS) Interactivity Support for 3GPP-Based Streaming and Download Services, 3GPP TR 26.953 V14.0.0 , Release 14, Mar. 2017, 36 pages.

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH), 3GPP TS 26.247 V16.0.0, Release 16, Sep. 2018, 137 pages.

3rd Generation Partnership Project;Technical Specification Group Services and System Aspects; Multimedia Broadcast/Multicast Service (MBMS); Protocols and codecs, 3GPP TS 26.346 , V15.0.0 , Release 15, Dec. 2017, 279 pages.

Fielding, et al., "Hypertext Transfer Protocol—HTTP/1.1," Network Working Group, Request for Comments: 2616, Obsoletes: 2068, Category: Standards Track, Jun. 1999, 122 pages.

International Search Report and Written Opinion—PCT/US2019/015563—ISA/EPO—dated Mar. 25, 2019.

ITU-T H.265, "Series H: Audiovisual and Multimedia Systems, Infrastructure of audiovisual services—Coding of moving video. High efficiency video coding," The International Telecommunication Union. Dec. 2016, 664 pp.

Paila T., et al., "FLUTE—File Delivery over Unidirectional Transport," Network Working Group, RFC 6726, Nov. 2012, Retrieved from http://tools.ietf.org/html/rfc6726, 46 Pages.

Qualcomm Incorporated., "New WID on 3GPP Service Interactivity," 3GPP Draft, SP-170796, Revision of SP-170607 S4-170738, 3rd Generation Partnership Project (3GPP), Mobile Competence Centre, 650, Route Des Lucioles, F-06921 Sophia-Antipolis Cedex, France, vol. TSG SA, No. Sapporo, Japan, Nov. 17, 2017, 3 Pages, XP051381048, Retrieved from the Internet: URL: http://www.3gpp.org/ftp/tsg%5Fsa/WG4%5FCODEC/TSGS4%5F96/Docs/ [retrieved on Nov. 17, 2017].

Qualcomm Incorporated., "pCR on Measurement and Reporting of Interactivity Usage," 3GPP Draft, S4-AHI764, 3rd Generation Partnership Project (3GPP), Mobile Competence Centre, 650, Route Lucioles, F-06921 Sophia-Antipolis, vol. SA WG4, No. S4-AHI764, Jan. 8, 2018, 5 Pages, XP051390882, Retrieved from the Internet: URL: http://www.3gpp.org/ftp/tsg%5Fsa/WG4%5FCODEC/Ad%2Dhoc%5FMBS/Docs%5FAHI/ [retrieved on Jan. 12, 2018].

Qualcomm Incorporated., "Proposed Way Forward on App-to-DASH Client APIs," 3GPP Draft, S4-171194, 3rd Generation Partnership Project (3GPP), Mobile Competence Centre, 650, Route Des Lucioles, F-06921 Sophia-Antipolis Cedex, vol. SA WG4, No. Albuquerque, USA, Nov. 12, 2017, 3 Pages, XP051380889, Retrieved from the Internet: URL: http://www.3gpp.org/ftp/tsg%5Fsa/WG4%5FCODEC/TSGS4%5F96/Docs/ [retrieved on Nov. 12, 2017].

* cited by examiner

SIGNALING AND REPORTING INTERACTIVITY USAGE IN STREAMING SERVICES

This application claims the benefit of U.S. Provisional Application No. 62/623,384, filed Jan. 29, 2018, the entire contents of which are hereby incorporated by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for signaling reporting expectations to a streaming client, such as a Dynamic Adaptive Streaming over HTTP (DASH) client or a Multimedia Broadcast/Multicast Service (MBMS) client, and for the streaming client to report data consumption according to the reporting expectations.

In one example, a method of reporting interactivity usage information while presenting streamed media data including receiving, by a streaming client of a client device, a manifest file indicating reporting expectations representing data to be reported by the streaming client to a reporting server device during a media streaming session, sending, by the streaming client, data representative of the reporting expectations to an interactivity application executed on the client device, receiving, by the streaming client, interactivity usage information from the interactivity application executed on the client device, and reporting, by the streaming client, the interactivity usage information to the reporting server device.

In another example, a device for reporting interactivity usage information while presenting streamed media data includes a memory configured to store media data, and a processor implemented in circuitry and configured to execute a streaming client to receive a manifest file indicating reporting expectations representing data to be reported by the streaming client to a reporting server device during a media streaming session, send data representative of the reporting expectations to an interactivity application executed on the client device, receive interactivity usage information from the interactivity application executed on the client device, and report the interactivity usage information to the reporting server device.

In another example, a device for reporting interactivity usage information while presenting streamed media data includes means for receiving a manifest file indicating reporting expectations representing data to be reported by the streaming client to a reporting server device during a media streaming session, means for sending data representative of the reporting expectations to an interactivity application executed on the client device, means for receiving interactivity usage information from the interactivity application executed on the client device, and means for reporting the interactivity usage information to the reporting server device.

In another example, a computer-readable storage medium has stored thereon instructions that, when executed, cause a processor of a client device executing a streaming client to receive a manifest file indicating reporting expectations representing data to be reported by the streaming client to a reporting server device during a media streaming session, send data representative of the reporting expectations to an interactivity application executed on the client device, receive interactivity usage information from the interactivity application executed on the client device, and report the interactivity usage information to the reporting server device.

The details of one or more examples are set forth in the accompanying drawings and the description below. Other features, objects, and advantages will be apparent from the description and drawings, and from the claims.

DETAILED DESCRIPTION

Figure 1:
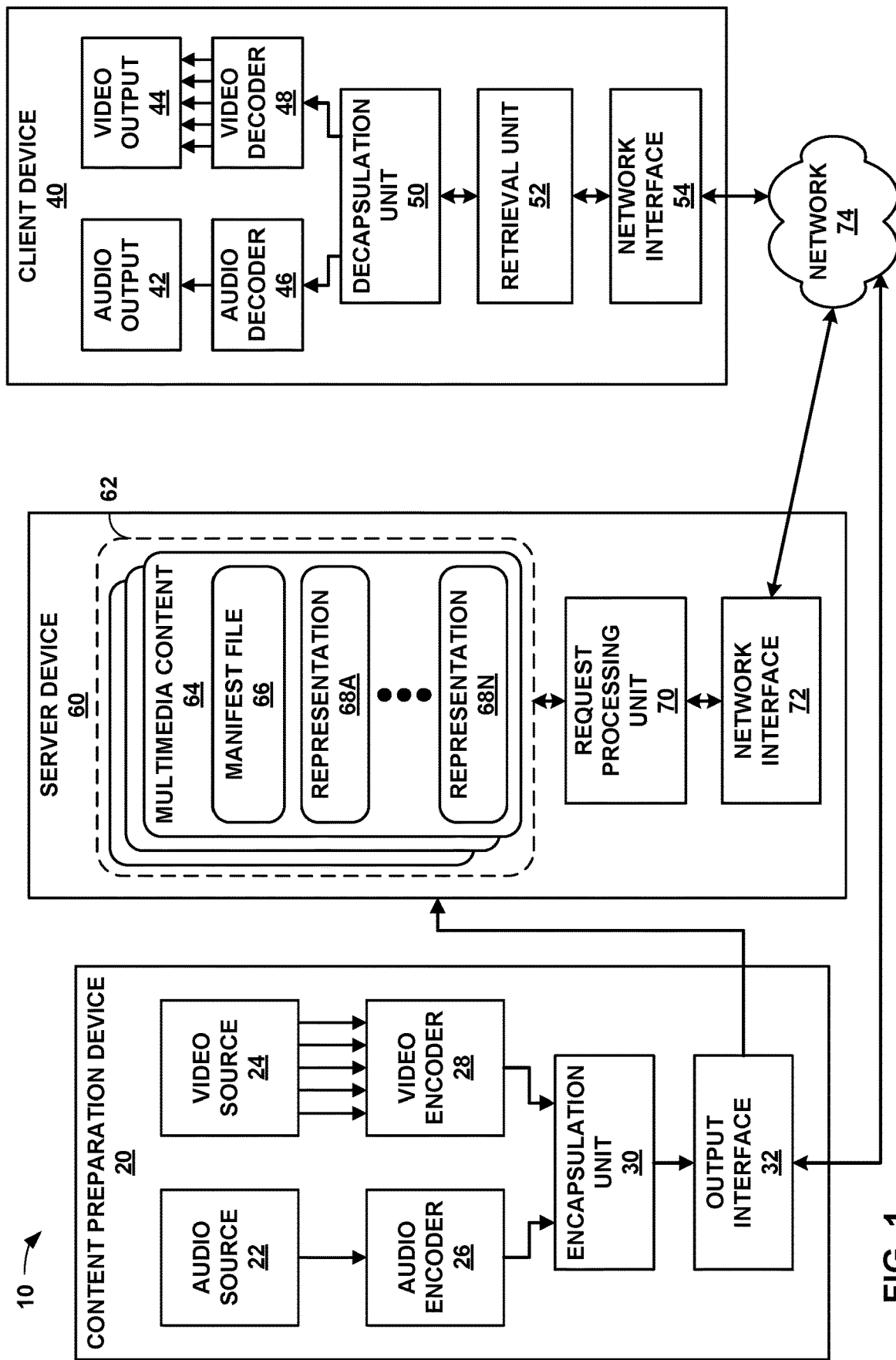
FIG. 1 is a block diagram illustrating an example system that implements techniques for streaming media data over a network.

In general, this disclosure describes techniques related to reporting usage of various streaming services, such as Dynamic Adaptive Streaming over HTTP (DASH). That is, a server device may use these techniques to describe consumption reporting expectations of a client device, and a client device may use these techniques to determine the reporting expectations.

DASH formatted streaming is popularly employed not only in over the top (OTT) media distribution services, but also in broadcast TV and cellular broadcast services such as Third Generation Partnership Project (3GPP) Multimedia Broadcast/Multicast Service (MBMS). Service interactivity events which enable explicit user input or other forms of active engagement, during the presentation of a main program, can be attractive to both application and content providers and the end user. For application and/or content providers, knowledge about user consumption or engagement with interactive content of different forms enables the providers to gain more knowledge about user behaviors and interests, which can lead to more personalized service offerings, as well as generate additional revenues from user activities, such as online purchasing, betting, or consumption of targeted advertisements, during interactivity events. Such user activities may represent interaction with interactive elements, such as advertisements, shopping carts, items available for purchase, bet placing elements, hyperlinks, or the like.

In 3GPP, there is an existing Rel-15 Work Item on Service Interactivity (Tdoc SP-170796, "New WID on Service Interactivity (SerInter)," Rel-15 Work Item approved during SP #77, September 2017), for which one of the objectives is the capability for the mobile network operator, acting either as the application/content service provider, or on behalf of 3rd party service providers, to collect information on interactivity usage by users from the DASH client or MBMS client software in mobile devices. Specifically, the operator should be able to define the various metrics to be contained in those interactivity usage reports, such as the amount of viewing of interactive advertisements, time duration of user engagement with the interactivity content (also referred to herein as "interactive elements"), number of click-throughs by the user of embedded links in the displayed interactivity content, number of purchases or bet placements (and possibly associated monetary value of those transactions) associated with interactivity events, user demographic information associated with interactivity usage reports (subject to fulfilling user consent requirements), etc. The operator should be able to specify the occurrence times, frequency and duration for which interactivity usage information are reported back. In addition, the operator should have control in selection among the user/device population to perform interactivity usage reporting, for example, by setting a target percentage of (random) users to report, or designating specific users/devices to perform reporting, based on prior knowledge of those users and identifying them by a simple code pre-known to both the user/device and the operator.

Also as part of the 3GPP Service Interactivity work item, a set of application programming interfaces (APIs) in support of service interactivity features will be defined between the DASH client in the user device and the interactivity application. Given that service interactivity information is application layer functionality, one of those APIs is designed to enable the interactivity application, the entity possessing such knowledge of interactivity usage by the user, to forward that information to the DASH client. Doing so allows the service provider to leverage the existing metrics reporting functionality as defined in 3GPP DASH (TS 26.247), from the DASH client to a network report server. Furthermore, in the case of a DASH-over-MBMS service, the DASH client may choose to rely on the MBMS client function to perform the actual reporting, via existing MBMS reception reporting mechanisms.

In particular, the 3GPP Service Interactivity work item lists the following functionalities to be supported regarding the measurement and reporting of interactivity-related usage:

Use of MBMS service layer mechanisms to announce the parameters and criteria regarding interactivity consumption reporting.

Capability for the MBMS service provider to either randomly or selectively control the user/device population to perform such reporting.

Utilization of existing MBMS service layer mechanisms and architecture (e.g., MBMS reception or consumption reporting)

Definition of a service framework that can ensure the protection of user identity and privacy associated with the interactivity usage reporting.

In broadcast or unicast delivery of DASH-formatted services, interactivity consumption measurement and associated information pertain to application layer functionality. As part of fulfilling the above objectives, 3GPP is "outsourcing" to the DASH Industry Forum (DASH-IF) the specification of an API between the interactivity application and the DASH client to enable the application to forward interactivity usage measurement information to the DASH client. The DASH client is then expected to report that information to a network server, via, for example, extension to the existing DASH Quality of Experience (QoE) reporting mechanism as defined in TS 26.247 (clause 10), or, in the case of a DASH-over-MBMS service, by leveraging MBMS reception reporting to "piggyback" interactivity usage measurements onto MBMS Reception Reporting in a manner similar to the carriage DASH QoE metrics reporting in MBMS Reception Reports, as described in TS 26.346 (clause 9.4.8).

TR 26.953, "Interactivity Support for 3GPP-Based Streaming and Download," is the output document of the Rel-14 Service Interactivity study item ('FS_IS3'). TR 26.953 summarizes the recommended requirements of the "Measurement and Reporting of Interactivity Usage" use case described in that document. TR 26.953 notes the following:

It ought to be possible for the 3GPP service provider to define the following parameters contained in the interactivity usage reports: amount of viewing of interactive advertisements, time duration of user engagement with the interactivity content, number of click-throughs by the user of embedded links in the displayed interactivity content, number of purchases (and possibly associated monetary value of those purchases) associated with interactivity events, user demographic information associated with interactivity usage reports (subject to fulfilling user opt-in requirements), etc.

It ought to be possible for the 3GPP service provider, in the interactivity usage reporting sessions it defines, to specify a) the reporting time window(s) during which user devices are expected to upload interactivity usage information, b) the specific interactivity events to be reported, and c) selection criteria for reporting devices.

It ought to be possible for the 3GPP service provider to specify two types of interactivity usage reporting sessions:

a) Randomly-sampled session. In this type of reporting session, the device decides via a random sampling method whether or not it ought to participate in the reporting of interactivity usage. For example, the 3GPP service provider may include a "sample percentage" value in service announcement signaling, similar to such parameter in the Associated Delivery Procedure Description (ADPD) fragment in MBMS, to effectively specify the target percentage of UEs to perform interactivity usage reporting.

b) Targeted group session. In this type of reporting session, it is assumed that demographic information of each end-user of the device is known to the service operator. The method to collect such user data is not expected to rely on the user providing this information outside of the application or service that intends to make use of the data. For example, each user may be associated with a certain identifier, such as a Group ID which may pertain to age, race, sex, education, income, residential community type, etc. (subject to meeting service subscription related terms and/or regulatory requirements on user privacy). Indication of the Group ID affiliated with a device may be provided inside the application or the service, or via a notification mechanism (e.g., SMS), or through unicast interaction between the UE and a network server. Only those devices whose local Group ID matches the Group ID value contained in service discovery/announcement information, for example the MBMS USD, will be required to report interactivity-related usage.

The above recommended requirements should serve as guidelines on specific interactivity usage reporting functionalities to be specified in the Service Interactivity work item.

Per the above, it should be possible for the service provider to specify the parameters (e.g., measurement parameters) to be included in interactivity usage reports. A non-exhaustive list of such measurement parameters includes:

Time duration of viewing of interactivity-related content (e.g., advertisement);
Time interval of user engagement with interactivity content (interactive adverts, pop-up links and menus, etc.);
Number of click-throughs during user engagement with the interactivity content;
URIs of sites visited/resources acquired by the user during the interactivity event;
Number and possibly associated monetary value of online purchases associated with service interactivity incidences;
User demographics or profile information associated with the interactivity consumption (assuming user opt-in to releasing such personal information). An example of such profile information is the GroupID as described with respect to targeting of devices for reporting below.

Additional parameters that may be included with interactivity usage reports (as required by the application provider or service provider) may include, for example, the time of day or day of the week, and/or the geographical location of interactivity occurrence, and a means should be devised to allow proprietary or application-specific parameters to be conveyed in interactivity usage reports.

In addition, the service provider may choose to specify an "Interactivity Usage Event List," which corresponds to a time ordered list of interactivity usage related event information. Each event in the list denotes the occurrence of a specific form of interactivity usage, during a time interval whose start and end times are represented as media times. The start and end times of each successive event in the list are monotonically increasing. Such Event List is conceptually similar to the PlayList as defined under DASH QoE reporting in TS 26.247, in providing detailed information for each listed entry. The set of interactivity usage related parameters for each period may include any of those as indicated previously. Should the application not possess information for a requested parameter, the application may indicate that parameter as not available in the interactivity usage measurement report for the corresponding measurement period.

The above parameters may be notified by the DASH client to the interactivity application to enable the subsequent reporting by the application. This may be done via the DASH client API that enables the sending of measurements of interactivity-specific consumption from the application to the DASH client.

Reporting expectations may include reporting timing, frequency, and/or threshold. As noted above, the application or service provider may specify the time of the day and/or the periodicity at which interactivity usage reports must be submitted, e.g., every day at 9 PM, hourly during Saturday and Sunday, etc. Alternatively, the provider may require that a report only be generated when the level of user engagement exceeds a certain threshold, such as in the number of occurrences, or duration within a specified time window. In addition, like the file repair and reception reporting mechanisms as defined in TS 26.346, the provider may specify the use of random back-off times relative to the nominal start time to spread out the unicast interactivity report traffic more evenly over time.

Reporting techniques may also include targeting of devices for reporting. As indicated above, the application or service provider that collects service interactivity consumption information may wish to obtain reports in a controlled manner. For example, similar to MBMS reception or consumption reporting, the provider might choose interactivity reports to be produced by a random sample of user devices, by means of a defined sample percentage. Alternatively, the application/service provider might specify devices to perform reporting by GroupID. Each device may have an assigned GroupID, whose value maps to specific user information known to the provider, such as demographics or preference data gathered from the service subscription, or derived by user analytics (for example, based on user behavioral profiles derived from previous viewing, purchasing or other usage-related history). Other methods of selective control of users/devices to perform interactivity usage reporting may also be used.

The techniques of this disclosure may be used to provide MBMS service layer consumption mechanisms, capabilities for an MBMS service provider to cause users and/or client devices to perform reporting, and to use existing MBMS service layer mechanisms and architecture to achieve these goals. For example, this disclosure describes example mechanisms for the network to signal to the DASH client about interactivity usage metrics to be reported, server location, targeting criteria, reporting protocol, and other reporting-related metadata.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol-HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, retrieval unit 52 of client device 40 and request processing unit 70 of server device 60 may communicate various reporting data. For example, request processing unit 70 may indicate reporting expectations, and retrieval unit 52 may report media consumption according to the reporting expectations, in accordance with the techniques of this disclosure.

Server device 60 and/or request processing unit 70, or other network elements, may employ different methods to inform client device 40 (also referred to as "user equipment" or "UE") about interactivity usage reporting requirements, for example, by using service signaling to convey the following types of information: measurement parameters to be included in an interactivity usage report, temporal or threshold based reporting criteria, and targeting information on specific devices to perform reporting, which were described above. Each may involve a DASH client of retrieval unit 52 in some manner, given that the DASH client is expected to receive interactivity usage information from the interactivity application via an API (to be defined by the DASH-IF) between these entities.

One solution is for the DASH client of retrieval unit 52 to report interactivity usage measurement information it receives from the application directly to a network server. Two example derivative solution options are also envisioned:

The first example solution is to extend the existing definition of metrics, quality reporting scheme, and quality reporting protocol as specified in TS 26.247 (clause 10) by adding interactivity usage metrics and associated reporting functionality to those which are currently limited to QoE.

The second example solution, similar to the first, will extend the definition of metrics to include interactivity usage metrics. However, unlike the first, the second solution will define a separate and new reporting scheme, specific to interactivity usage metrics, and which is also extensible to include new interactivity usage metrics to be added in the future. The existing reporting protocol as documented in TS 26.247 (clause 10.6.3) can be used for the sending of interactivity usage reports by the DASH client to the network server, e.g., retrieval unit 52 to server device 60.

Tdocs 54-180xxx ("Interactivity Usage Reporting by DASH Client—Option 1") and S4-180yyy ("Draft CR on Interactivity Usage Reporting by DASH Client—Option 2") describe the two alternatives for direct reporting of interactivity usage measurements by the DASH client to the report server. The techniques described therein may be performed by, e.g., server device 60 or client device 40.

A third solution for interactivity usage reporting involves emulating the existing mechanism as defined in TS 26.346, clause 9.4.8, such that the DASH client can rely on the MBMS client to perform the interactivity usage reporting. This solution would operate similarly to the method as defined in TS 26.346 for combining DASH QoE reporting with MBMS reception reporting.

For any of the three solution options to work, and as previously indicated above, besides the signaling to the DASH client (of retrieval unit 52) of the parameters to be included and criteria for interactivity usage reporting to the network (e.g., server device 60), those parameters and criteria information must be provided by the DASH client to the interactivity application. This may be accomplished by the same DASH client API that enables the sending of measurements of interactivity-specific consumption from the application to the DASH client.

Figure 2:
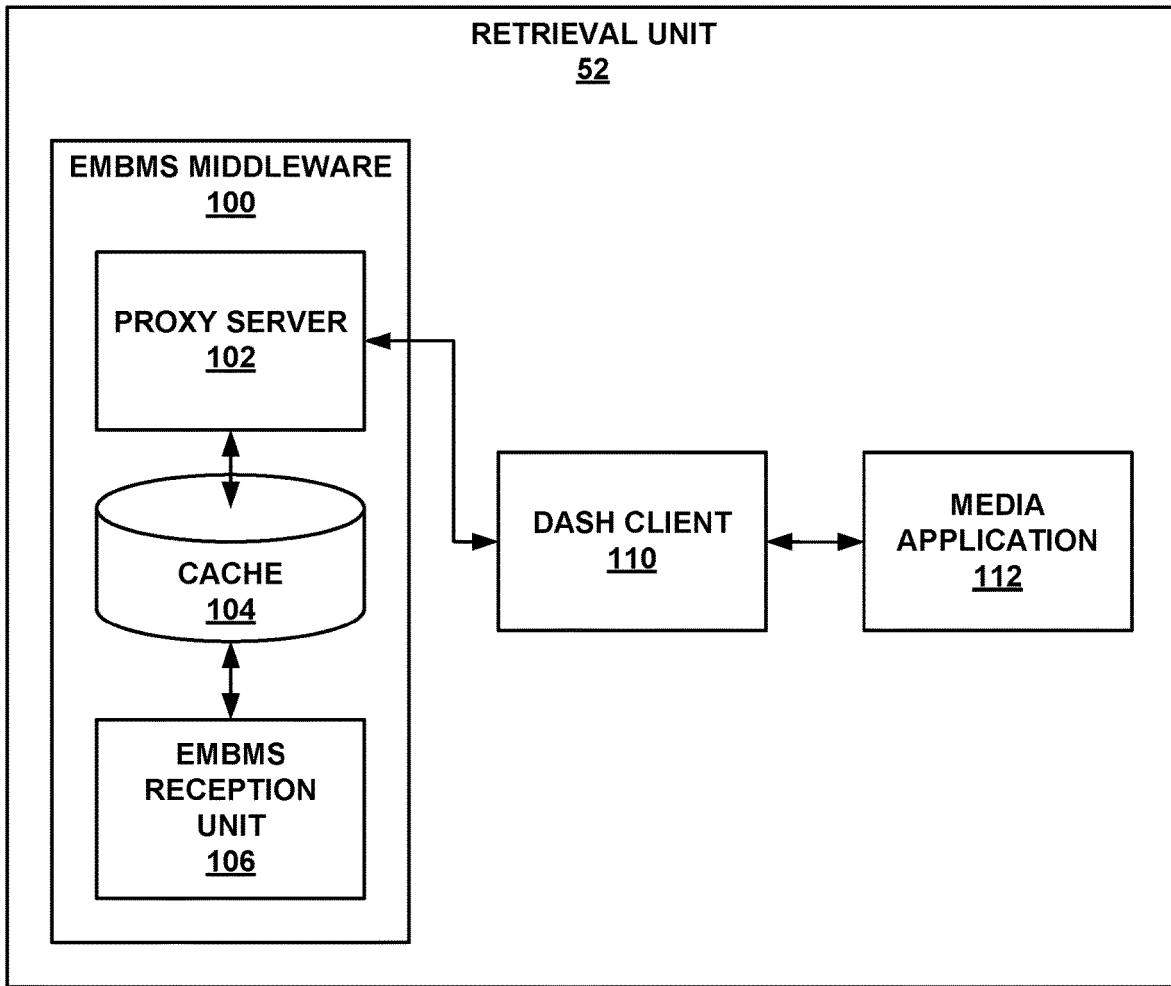
FIG. 2 is a block diagram illustrating an example set of components of a retrieval unit in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit 100 may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Media application 112 may correspond to, for example, a web browser or a web browser plug-in. In accordance with techniques of this disclosure, media application 112 may present media data and interactivity elements, such as hyperlinks, radio buttons, check boxes, and/or other forms of user interface (UI) displays or controls, along with the media data. Moreover, media application 112 may accept user input, such as keyboard input, mouse input, touchscreen input, gesture input, or the like to interact with the interactivity elements.

Furthermore, according to the techniques of this disclosure, DASH client 110 may receive a manifest file (such as manifest file 66 of FIG. 1) including data indicating reporting information to be reported to a reporting server (such as server device 60 or a separate server device, not shown in FIGS. 1 and 2). The manifest file may be a DASH media presentation description (MPD). The reporting information may include quality of experience (QoE) reports for DASH, as well as interactivity usage reports.

In some examples, the existing QoE reporting portion of the manifest file according to DASH may be extended to include data representing interactivity usage information that is to be reported. That is, the overall DASH QoE reporting framework may be modified by extension to include signaling of interactivity usage information metrics, reporting criteria, and a reporting scheme. DASH client 110 may receive reporting data from media application 112, and deliver corresponding reporting data to a network server device, such as server device 60 or a separate reporting device. Such server could be the same as, or different from, the entity that receives QoE reports from DASH client 110. The DASH QoE reporting framework may be modified to additionally support the reporting of application-layer service interactivity usage information, according to the techniques of this disclosure.

The manifest file may include elements describing reporting related to an interactivity summary (IntySummary) and an interactivity event list (IntyEventList). IntySummary may contain summation information for one or more types of interactivity usage measurement to be reported by DASH client 110 to a network server, in accordance with reporting and targeting criteria present under this parameter. IntyEventList may denote a time-ordered list of interactivity events and the interactivity usage information associated with each of the events. IntyEventList may correspond to the description of the Interactivity Usage Event List in Sec. 2.2 of 54-180aaa, "Requirements and Framework on Measurement and Reporting of Interactivity Usage", contribution from Qualcomm for S4#97 meeting, February 2018. Examples of data structures of the above interactivity metrics are described below. The IntySummary and IntyEventList parameters may appear in the manifest file (e.g., an MPD) in addition to one or more QoE-related metrics (RepSwitchList, AvgThroughput, InitialPlayoutDelay, BufferLevel, PlayList, MPDInformation, PlayoutDelayforMediaStartup, and DeviceInformationList) as expressed by the MPD.Metrics@metrics attribute. DASH client 110 may also be configured according to semantics for the IntySummary and IntyEventList parameters as described below.

The IntySummary element may contain summary information on different metrics for measuring user consumption of interactivity content, or engagement with user interface (UI) functionality such as viewing, clicking on or selection of hyperlinks, radio buttons, check boxes, and/or other forms of UI displays or controls. Occurrences of opportunities for such user input may be pre-scheduled or unplanned during the playout of a main program. Examples of interactivity content include advertisements and auxiliary content accessible under user control during the occurrence of an interactivity event during a main program. Other interactivity usage metrics may have explicit monetary significance, by their linkage to transactions such as online purchasing or betting. The table below represents an example set of elements of the IntySummary element:

| Key | Type | Description |
| --- | --- | --- |
| IntySummary | Object | Summarized information on interactivity usage associated with the set of interactivity event occurrences covered by an interactivity usage report |
| Parameters | List | Collection of one or more parameters pertaining to interactivity usage |
| consumptionDuration | Integer | Total measured time duration in milliseconds of user consumption of rendered interactivity content (e.g., video or audio) |

-continued

| Key | | Type | Description |
|---|---|---|---|
| | engagementInterval | Integer | Total measured time duration in milliseconds of user engagement with interactivity content via UI controls |
| | clickthrough | Integer | Number of click-throughs associated with user access of interactivity-related resources offered by UI controls |
| | groupId | String | Alias for the summarized profile or preference information associated with the user of the reporting device |
| | ResourceUri | List | List of URIs corresponding to sites visited or resources acquired by the user/device during the interactivity event(s) associated with the report |
| | Demographics | List | List of one or more parameters pertaining to user demographics information (age, race, sex, education, income, residential community type, etc.) according to a well-known and standardized classification scheme |
| | Monetary | List | Information on user engagement during interactivity events which has explicit monetary significance |
| | PurchaseRelated | List | Information on user purchasing activity during interactivity events |
| | pNumber | Integer | Total number of user purchasing transactions conducted during the interactivity events |
| | pValue | String | Total monetary value of the user purchases conducted during the interactivity events |
| | BetRelated | List | Information on user betting activity during interactivity events |
| | bNumber | Integer | Total number of user betting transactions conducted during the interactivity events |
| | bValue | String | Total monetary value of the user betting transactions conducted during the interactivity events |
| | PrivateExt | List | Container for proprietary or application-specific extensions on parameters to be included in the interactivity usage report |

The IntyEventList element may contain a time-ordered list of interactivity usage events and the details of the interactivity usage information for each event. The following table represents an example set of elements for the IntyEventList:

| IntyEventList | | Type | Description |
|---|---|---|---|
| IntyEventList | | List | A time-ordered list of interactivity events occurring during the playout of the main program, each containing detailed information on the incidences of interactivity usage during that event, as covered by an instance of the interactivity usage report. |
| Entry | | Object | A record of a single interactivity event |
| | mStart | Media Time | The media presentation time of the start of the interactivity event |
| | mStop | Media Time | The media presentation time of the end of the interactivity event |
| | groupId | String | Alias for the summarized profile or preference information associated with the user of the reporting device |
| | Demographics | String | List of one or more parameters pertaining to user demographics information (age, race, sex, education, income, residential community type, etc.) according to a well-known and standardized classification scheme |

-continued

| | | |
|---|---|---|
| Consumption | List | A list of time durations within the interactivity event duration during which the user consumed the rendered interactivity content (e.g., video or audio) |
| cStart | Media Time | The media presentation time of the start of the interactivity content consumption |
| cStop | Media Time | The media presentation time of the end of the interactivity content consumption |
| Engagement | List | A list of time durations within the interactivity event duration during which the user engaged with the interactivity content via UI controls |
| eStart | Media Time | The media presentation time of the start of user engagement with interactivity content |
| eStop | Media Time | The media presentation time of the end of user engagement with interactivity content |
| Clickthrough | List | A list of click-through actions performed by the user to access interactivity-related resources, as presented via UI controls, during the interactivity event |
| clickStart | Media Time | The media presentation time at which user performed a click/selection |
| resourceUri | String | URI of the site visited, or resource acquired by the user/device in association with the click/selection action |
| PurchasingAction | List | A list of user purchasing activities during the interactivity event |
| pStart | Media Time | The media presentation time of the start of user purchasing activity |
| pStop | Media Time | The media presentation time of the end of user purchasing activity |
| pCompletion | Boolean | Indication of whether the purchase activity resulted in successful/completed monetary transaction |
| BetAction | List | A list of user betting activities during the interactivity event |
| bStart | Media Time | The media presentation time of the start of user betting activity |
| bStop | Media Time | The media presentation time of the end of user betting activity |
| bCompletion | Binary | Indication of whether the betting activity resulted in successful/completed monetary transaction |
| PrivateExt | List | Container for proprietary or application-specific extensions on parameters to be included in the interactivity usage report |

DASH client 110 may prepare an XML-based report according to a reporting format defined in the manifest file (examples of which are described with respect to FIG. 3 below). In accordance with the techniques of this disclosure, DASH client 110 may prepare a report including both QoE and an interactivity usage report as an XML document that complies with the XML schema shown in the Appendix accompanying this document, which may have a MIME type of "application/3gpdash-qoe+iu-report+xml".

DASH client 110 may prepare the report to include additional QoE metrics according to the following schema:

```
<?xml version="1.0" encoding="UTF-8"?>
<xs:schema
    xmlns="urn:3gpp:metadata:2016:PSS:SupplementQoEMetric"
    xmlns:xs="http://www.w3.org/2001/XMLSchema"
    targetNamespace="urn:3gpp:metadata:2016:PSS:SupplementQoEMetric"
    elementFormDefault="qualified">
    <xs:element name="supplementQoEMetric" type="SupplementQoEMetricType"/>
    <xs:complexType name="SupplementQoEMetricType">
        <xs:sequence>
            <xs:element name="deviceinformation" type="DeviceInformationType" minOccurs="0"/>
```

```
            <xs:any namespace="##other" processContents="lax" minOccurs="0"
maxOccurs="unbounded"/>
        </xs:sequence>
    </xs:complexType>
    <xs:complexType name="DeviceInformationType">
        <xs:choice>
            <xs:element name="Entry" type="DeviceInformationEntryType"
maxOccurs="unbounded"/>
        </xs:choice>
        <xs:anyAttribute processContents="skip"/>
    </xs:complexType>
    <xs:complexType name="DeviceInformationEntryType">
        <xs:attribute name="start" type="xs:dateTime" use="required"/>
        <xs:attribute name="mstart" type="xs:duration" use="required"/>
        <xs:attribute name="videoWidth" type="xs:unsignedInt" use="required"/>
        <xs:attribute name="videoHeight" type="xs:unsignedInt" use="required"/>
        <xs:attribute name="screenWidth" type="xs:unsignedInt" use="required"/>
        <xs:attribute name="screenHeight" type="xs:unsignedInt" use="required"/>
        <xs:attribute name="pixelWidth" type="xs:double" use="required"/>
        <xs:attribute name="pixelHeight" type="xs:double" use="required"/>
        <xs:attribute name="fieldOfView" type="xs:double" use="required"/>
        <xs:anyAttribute processContents="skip"/>
    </xs:complexType>
</xs:schema>
<?xml version="1.0" encoding="UTF-8"?>
<xs:schema    xmlns="urn:3gpp:metadata:2016:PSS:schemaVersion"
        xmlns:xs="http://www.w3.org/2001/XMLSchema"
        targetNamespace="urn:3gpp:metadata:2016:PSS:schemaVersion"
        elementFormDefault="qualified">
    <xs:element name="schemaVersion" type="xs:unsignedInt"/>
    <xs:element name="delimiter" type="xs:byte"/>
</xs:schema>
```

When a supplementQoEMetric is to be sent and no ordinary QoEMetric is due, DASH client 110 may send a dummy MPDInformation metric with codecs="none", bandwidth=0, mimeType="none", representationId="none".

As another example, the manifest file may include data representing interactivity usage information to be reported separately from QoE metrics information. That is, the DASH client 110 may report QoE metrics separately from interactivity usage information, e.g., to the same or different reporting server devices. The manifest file may include interactivity usage information to be reported, such as the IntySummary and IntyEventList elements discussed above.

Although more specification complexity may be incurred by defining two separate 3GP-DASH reporting schemes, doing so has the advantage of allowing more flexibility in tailoring the reporting mechanism to each type of metric to be reported (QoE vs. interactivity usage), as well as providing separation between interactivity usage reporting, which typically involves some form of implicit or explicit user consent for sharing "private" information with the service or application provider, and QoE metrics reporting, which does not have privacy/consent implications.

In addition, DASH client 110 may be configured according to a new reporting protocol, specific to interactivity usage reporting, as defined below. Similar to the downside of creating an additional reporting scheme as discussed previously, there is advantage gained by decoupling QoE metrics reporting from interactivity usage reporting, such as designated time and/or frequency of reporting, as well as ensuring clean procedures and semantics for DASH client reporting of fundamentally different types of metrics.

In these examples, DASH client 110 may prepare an interactivity usage information report according to the following XML schema:

```
<?xml version="1.0"?>
<xs:schema xmlns:xs="http://www.w3.org/2001/XMLSchema"
    targetNamespace="urn:3gpp:metadata:2011:HSD:receptionreport"
        xmlns:sup="urn:3gpp:metadata:2018:PSS:SupplementIntyUsageMetric"
        xmlns:sv="urn:3gpp:metadata:2016:PSS:schemaVersion"
        xmlns="urn:3gpp:metadata:2011:HSD:receptionreport"
    elementFormDefault="qualified">
    <xs:element name="ReceptionReport" type="ReceptionReportType"/>
    <xs:complexType name="ReceptionReportType">
        <xs:choice>
            <xs:element name="IntyUsageReport" type="IntyUsageReportType"
minOccurs="0" maxOccurs="unbounded"/>
            <xs:any namespace="##other" processContents="skip" minOccurs="0"
maxOccurs="unbounded"/>
        </xs:choice>
        <xs:attribute name="contentURI" type="xs:anyURI" use="required"/>
        <xs:attribute name="clientID" type="xs:string" use="optional"/>
    </xs:complexType>
    <xs:complexType name="IntyUsageReportType">
        <xs:sequence>
            <xs:element name="IntyUsageMetric" type="IntyUsageMetricype"
```

-continued

```
minOccurs="1" maxOccurs="unbounded"/>
      <xs:element ref="sup:supplementIntyUsageMetric" minOccurs="0" maxOccurs="1"/>
      <xs:element ref="sv:delimiter"/>
      <xs:any namespace="##other" processContents="skip" minOccurs="0" maxOccurs="unbounded"/>
    </xs:sequence>
    <xs:attribute name="periodID" type="xs:string" use="required"/>
    <xs:attribute name="reportTime" type="xs:dateTime" use="required"/>
    <xs:attribute name="reportPeriod" type="xs:unsignedInt" use="required"/>
    <xs:anyAttribute processContents="skip"/>
  </xs:complexType>
  <xs:complexType name="IntyUsageMetricType">
    <xs:choice>
      <xs:element name="IntySummary" type="IntySummaryType"/>
      <xs:element name="IntyEventList" type="IntyEventListType"/>
    </xs:choice>
    <xs:anyAttribute processContents="skip"/>
  </xs:complexType>
</xs:schema>
```

For configuration done via QMC functionality, DASH client 110 may also send interactivity usage reports via the QMC functionality. For MPD or OMA-DM configuration, if a specific metrics server has been configured, DASH client 110 may send interactivity usage reports using the HTTP POST request carrying XML formatted metadata in its body. An example interactivity usage reporting based on HTTP POST request signaling is shown below:

```
POST http://www.exampleserver.com HTTP/1.1
Host: 192.68.1.1
User-Agent: Mozilla/4.0 (compatible; MSIE 8.0; Windows NT 6.1; Trident/4.0)
Content-Type: text/xml; charset=utf-8
Content-Length: 4408
<?xml version="1.0"?>
<ReceptionReport contentURI="http://www.example.com/content/content.mpd"
clientID="35848574673" xmlns="urn:3gpp:metadata:2011:HSD:receptionreport"
    xsi:schemaLocation="urn:3gpp:metadata:2011:HSD:receptionreport DASH-IntyUsage-Report.xsd"
xmlns:xsi="http://www.w3.org/2001/XMLSchema-instance">
  <IntyReport periodID="Period1" reportTime="2011-02-16T09:00:00" reportPeriod="500">
      <IntyUsageMetric>
        <IntyEventList>
          <Entry mStart="P0Y0M0DT0H10M" mStop="P0Y0M0DT0H20M">
            <Demographics demoEntry="male"/>
            <Consumption cStart="P0Y0M0DT0H11M" cStop="P0Y0M0DT0H12M7>
            <Engagement eStart="P0Y0M0DT0H13M" eStop="P0Y0M0DT0H14M7>
            <Clickthrough clickStart="P0Y0M0DT0H15M" resourceUri="http://www.example.com/"/>
            <PurchaseAction pStart="P0Y0M0DT0H16M" pStop="P0Y0M0DT0H17M/>
            <BetAction bStart="P0Y0M0DT0H18M" bStop="P0Y0M0DT0H19M7>
          </Entry>
        </IntyEventList>
      </IntyUsageMetric>
  </IntyUsageReport>
</ReceptionReport>
```

Although DASH client 110 is described as reporting QoE and interactivity usage information above, it should be understood that in some examples, DASH client 110 may send the report or data thereof to eMBMS middleware unit 100, which may then send the report (or assemble the data into and then send the report) to one or more reporting server devices.

Figure 3:
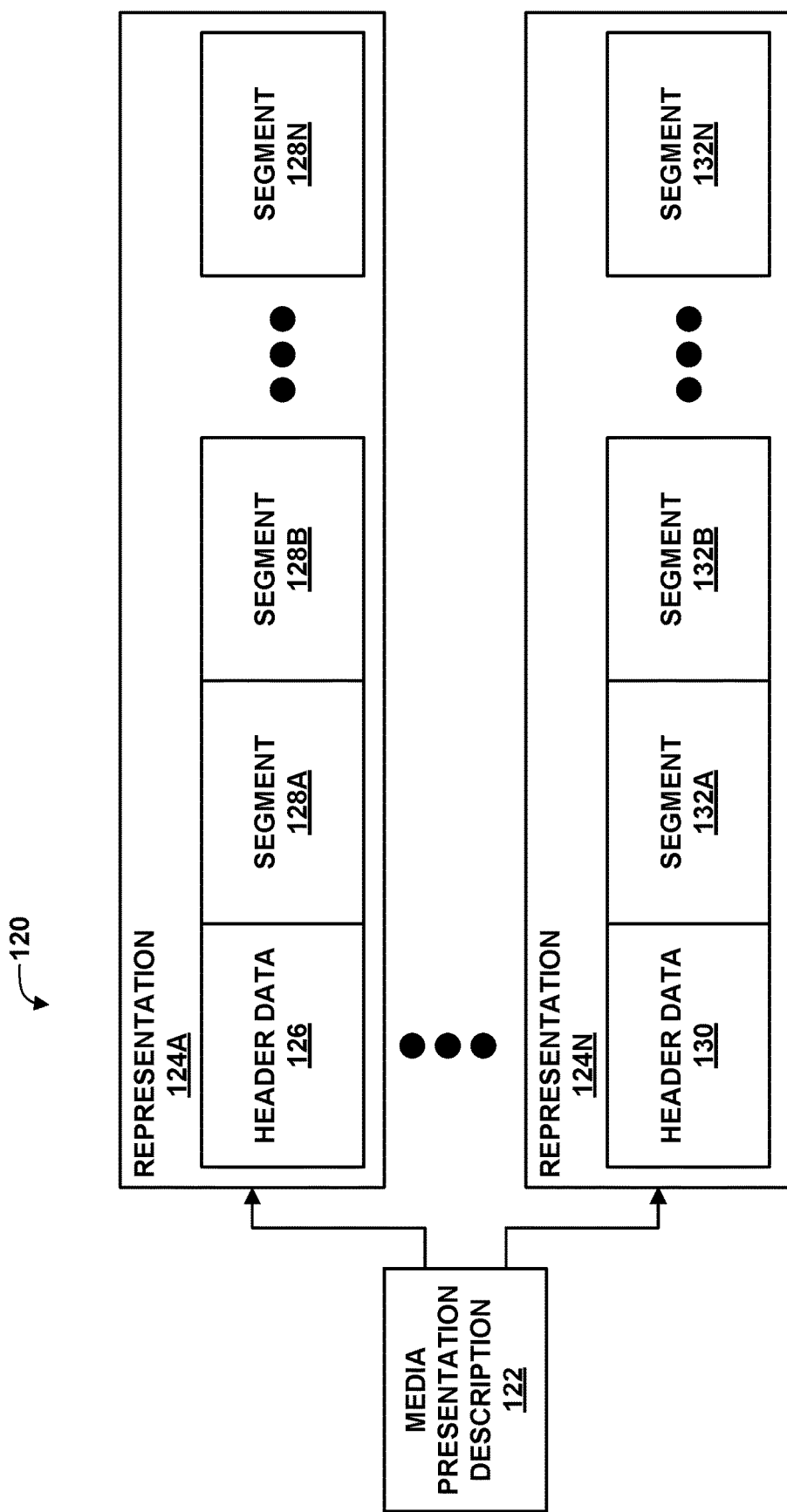
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

In accordance with techniques of this disclosure, MPD 122 may include data representing reporting expectations, that is, data to be reported by a streaming client (e.g., DASH client 110 of FIG. 2) to a reporting server device (e.g., server device 60 of FIG. 1 or a separate reporting server device) during a media streaming session.

DASH client 110 of FIG. 2 may extract the reporting expectations from MPD 122 and send data representing the reporting expectations to, e.g., media application 112. DASH client 110 may then receive data representative of usage of interactivity elements from media application 112 and report data representing the usage of the interactivity elements to the reporting server device. In some examples, DASH client 110 may format the data representing the usage of the interactivity elements according to format information extracted from MPD 112.

MPD 122 may also include any or all of data indicating a value to which a randomly generated value is compared to determine whether a client device is to participate in reporting of interactivity usage information, a sampling percentage value representing how frequently interactivity usage information reports are to be sent to the reporting server device, and/or a group identifier (GroupID) value indicating a group of devices that is to participate in reporting of interactivity usage information.

In one example, a DASH client (e.g., DASH client 110 of FIG. 2) may directly report interactivity usage information to a network server (that is, a reporting server device). Existing metric definitions, quality reporting scheme, and quality reporting protocol as specified in TS 26.247 may be extended to include interactivity usage metrics and to support the associated interactivity usage reporting functionality. That is, existing DASH QoE metric definitions and the associated reporting scheme and protocol as defined in clause 10 of TS 26.247 may be extended to perform the techniques of this disclosure. MPD 122 may include an MPD Metrics element according to the table below:

| Element or Attribute Name | Use | Description |
|---|---|---|
| Metrics | | DASH QoE and Interactivity Usage metrics element |
| @metrics | M | This attribute lists all quality and interactivity usage metrics (as a list of metric keys as defined in section 10.2, separated by a whitespace) that the client shall report. Certain keys allow specifying a measurement interval or period over which a single value of the metric is derived and potentially also other parameters controlling the collection of the metrics. The parameters, if any, are included in parentheses after the key and their semantics are specified in clause 10.2 with the metric definition itself. |
| Range | 0 . . . N | When specified, it indicates the time period during which quality and/or interactivity usage metric collection is requested. When not present, metric collection is requested for the whole duration of the content. |
| @starttime | O | When specified, it indicates the start time of the quality and/or interactivity usage metric collection operation. When not present, such metric collection is requested from the beginning of content consumption. For services with MPD@type "Live", the start time of metric collection can be obtained in wallclock time by adding the value of this attribute indicated in media time to the value of the MPD@availabilityStartTime attribute. For services with MPD@type "OnDemand", |

-continued

| Element or Attribute Name | Use | Description |
|---|---|---|
| | | the start time is indicated in media time and is relative to the PeriodStart time of the first period in this MPD. |
| @duration | O | When specified, it indicates the duration of the quality and/or interactivity usage metric collection period. The value of this attribute is expressed in media time. |
| LocationFilter | 0 . . . 1 | When present, this element indicates the geographic area(s) or location(s) where quality and/or interactivity usage metric collection is requested. When not present, metric collection is requested regardless of the device's location. The LocationFilter element comprises one or more instances of any combination of targeted cell-IDs, polygons and circular areas. Each cell-ID entry in LocationFilter is announced in cellList, and each polygon and circular area entry is announced in the polygonList or and circularAreaList elements, respectively. |
| cellList | 0 . . . N | This element specifies a list of cell identified by E-UTRAN-CGI or CGI. |
| shape | | Geographic area comprising one or more instances of polygonList and/or circularAreaList elements. |
| polygonList | 0 . . . N | This element, when present, comprises a list of 'Polygon' shapes as defined by OMA MLP[51]. |
| @confLevel | O | This attribute indicates the probability in percent that the DASH client is located in the corresponding polygon area. It is defined as 'lev_conf' by OMA MLP. If not present, it has default value of 60. |
| circularAreaList | 0 . . . N | This element, when present, comprises a list of 'CircularArea' shapes as defined by OMA MLP[51]. |
| @confLevel | O | This attribute indicates the probability in percent that the DASH client is located in the corresponding circular area. It is defined as 'lev_conf' by OMA MLP. If not present, it has default value of 60. |
| StreamingSourceFilter | 1 . . . N | The streaming source filter controls the streaming sources for which QoE metrics are collected and reported. The filter is defined as a URL pattern. If any streaming source filters are present, and the MPD URL of a media presentation does not match any of the filter values, then reporting is disabled, and the DASH client shall not report the requested QoE metrics for that media presentation. If no filter is present, then reporting is enabled for any streaming source. The filter is only intended to be used when reporting is activated by the QMC functionality as specified in Annex L. |
| @streamingsource | M | Streaming source filter pattern represented by a POSIX regular expression as specified by IEEE Std 1003.1-2008 [52]. |
| Reporting | 1 . . . N | Descriptor that provides information about the requested Quality and/or Interactivity Usage Reporting method and formats. See clause 10.5 of the 3GP-DASH quality and interactivity usage reporting scheme. |

Legend:
For attributes: M = Mandatory, O = Optional, OD = Optional with Default Value, CM = Conditionally Mandatory.
For elements: <minOccurs> . . . <maxOccurs> (N = unbounded) Elements are bold; attributes are non-bold and preceded with an @.

The following table provides example semantics of quality and interactivity usage reporting scheme information:

| Element or Attribute Name | Use | Description |
| --- | --- | --- |
| @apnQoE | O | This attribute gives the access point that should be used for sending the QoE reports, if different from that for sending the interactivity usage reports. Absence of @apnIntyUsage in the reporting scheme information implies that the same access point shall be used for sending of both QoE and interactivity usage reports. |
| @apnIntyUsage | O | This attribute gives the access point that should be used for sending the interactivity usage reports, and which is expected to be different from the access point for sending QoE reports. |
| @format | O | This field gives the requested format for the reports. Possible formats are: "uncompressed" and "gzip". |
| @samplePercentage | O | Percentage of the clients that should report QoE. The client uses a random number generator with the given percentage to find out if the client should report or not. |
| @samplePercentageInty | O | Percentage of the clients that should report interactivity usage. The client should use a random number generator with the given percentage to find out if the client should report or not. |
| @qoeReportingServer | M | The reporting server URL to which the QoE reports will be sent. Interactivity usage reports may also be sent to this server. |
| @intyUsageReportingServer | O | The reporting server URL to which the interactivity usage reports will be sent, and which is expected to be different from the server to which QoE reports are sent. Absence of this attribute implies that interactivity usage reports shall be sent to the same server that receives the QoE reports. |
| @intyReportingTime | O | Indication of the media presentation time that the first interactivity usage report should be sent by the client. |
| @reportingInterval | O | Indicates the time interval(s) between successive transmissions of QoE and/or interactivity usage reports. If not present, then the client should send a report after the streaming session has ended. If present, @reportingInterval = n indicates that the client should send a report every n-th second provided that new metrics information has become available since the previous report. |
| GroupID | 0 . . . 1 | A set of one or more identifiers, representing aliases associated with and known to the client devices, used to identify that/those device(s) which should perform interactivity usage reporting. Presence of this attribute and @samplePercentageInty should be mutually exclusive. |

Legend:

For attributes: M = Mandatory, O = Optional, OD = Optional with Default Value, CM = Conditionally Mandatory.

For elements: <minOccurs> . . . <maxOccurs> (N = unbounded) Elements are bold; attributes are non-bold and preceded with an @

The following XML represents an example syntax of quality and interactivity usage reporting scheme information for the example semantics of the table above:

```
<?xml version="1.0"?>
<xs:schema
targetNamespace="urn:3GPP:ns:PSS:AdaptiveHTTPStreaming:2009:qm"
    attributeFormDefault="unqualified"
    elementFormDefault="qualified"
    xmlns:xs="http://www.w3.org/2001/XMLSchema"
    xmlns:xlink="http://www.w3.org/1999/xlink"
    xmlns="urn:3GPP:ns:PSS:AdaptiveHTTPStreaming:2009:qm">
    <xs:annotation>
        <xs:appinfo>3GPP DASH Quality and Interactivity Usage Reporting</xs:appinfo>
        <xs:documentation xml:lang="en">
Reporting</xs:appinfo>
    <xs:documentation xml:lang="en">
        This Schema defines the quality and interactivity reporting scheme information for 3GPP DASH.
        </xs:documentation>
    </xs:annotation>
    <xs:element name="ThreeGPQualityAndIntyUsageReporting" type="SimpleQualityAndIntyReportingType"/>
    <xs:complexType name="SimpleQualityAndIntyReportingType">
        <xs:sequence>
            <xs:element name="GroupID" type="xs:string" minOccurs="0"/>
        </xs:sequence>
        <xs:attribute name="apnQoE" type="xs:string" use="optional"/>
        <xs:attribute name="apnIntyUsage" type="xs:string" use="optional"/>
        <xs:attribute name="format" type="FormatType" use="optional"/>
        <xs:attribute name="samplePercentage" type="xs:double" use="optional"/>
        <xs:attribute name="samplePercentageInty" type="xs:double" use="optional"/>
        <xs:attribute name="qoeReportingServer" type="xs:anyURI" use="required"/>
        <xs:attribute name="intyUsageReportingServer" type="xs:anyURI" use="optional"/>
        <xs:attribute name="intyReportingTime" type="xs:duration" use="optional"/>
        <xs:attribute name="reportingInterval" type="xs:unsignedInt" use="optional"/>
        <xs:anyAttribute processContents="skip"/>
    </xs:complexType>
    <xs:simpleType name="FormatType">
        <xs:restriction base="xs:string">
            <xs:enumeration value="uncompressed" />
            <xs:enumeration value="gzip" />
        </xs:restriction>
    </xs:simpleType>
</xs:schema>
```

In another example, DASH client 110 may directly report interactivity usage information to a network server (a reporting server device). MPD 122 may include a new, separate section on interactivity usage metric definitions, and DASH client 110 may perform according to an associated interactivity usage reporting scheme and reporting protocol according to the new section on interactivity usage metric definitions of MPD 122. In this manner, interactivity usage reporting may be decoupled from QoE reporting by DASH client 110.

Example semantics of interactivity usage reporting scheme information are shown in the following table:

| Element or Attribute Name | Use | Description |
| --- | --- | --- |
| @apn | O | This attribute gives the access point (an access point name) that should be used for sending the interactivity usage reports. |
| @format | O | This field gives the requested format for the reports. Possible formats are: "uncompressed" and "gzip". |
| @samplepercentage | O | Percentage of the clients that should report interactivity usage. The client should use a random number generator and compare the generated output with the given percentage in determining whether to perform reporting. |
| @reportingserver | M | The reporting server URL to which the interactivity usage reports will be sent. |

-continued

| Element or Attribute Name | Use | Description |
|---|---|---|
| @reportingTime | O | Indication of the media presentation time that the first interactivity usage report should be sent by the client. |
| @reportinginterval | O | Indicates the time interval(s) between successive transmission of interactivity usage reports. If present, @reportingInterval = n indicates that the client should send a report every n-th second provided that new metrics information has become available since the previous report. |
| GroupID | 0 . . . 1 | A set of one or more identifiers, representing aliases associated with and known to the client devices, used to identify that/those device(s) which should perform interactivity usage reporting. Presence of this attribute and @samplePercentageInty should be mutually exclusive |

Legend:
For attributes: M = Mandatory, O = Optional, OD = Optional with Default Value, CM = Conditionally Mandatory.
For elements: <minOccurs> . . . <maxOccurs> (N = unbounded) Elements are bold; attributes are non-bold and preceded with an @

Example syntax of interactivity usage reporting scheme information according to the example semantics above are shown in the following XML schema:

```
<?xml version="1.0"?>
<xs:schema
targetNamespace="urn:3GPP:ns:PSS:AdaptiveHTTPStreaming:2009:qm"
    attributeFormDefault="unqualified"
    elementFormDefault="qualified"
```

-continued

```
xmlns:xs="http://www.w3.org/2001/XMLSchema"
xmlns:xlink="http://www.w3.org/1999/xlink"
xmlns="urn:3GPP:ns:PSS:AdaptiveHTTPStreaming:2018:iu">
<xs:annotation>
    <xs:appinfo>3GPP DASH Interactivity Usage Reporting</xs:appinfo>
    <xs:documentation xml:lang="en">
```

This Schema defines the interactivity reporting scheme information for 3GPP DASH.

```
    </xs:documentation>
    </xs:annotation>
    <xs:element name="ThreeGPIntyUsageReporting"
type="SimpleIntyReportingType"/>
    <xs:complexType name="SimpleIntyReportingType">
        <xs:sequence>
            <xs:element name="GroupID" type="xs:string" minOccurs="0"/>
        </xs:sequence>
        <xs:attribute name="apn" type="xs:string" use="optional"/>
        <xs:attribute name="format" type="FormatType" use="optional"/>
        <xs:attribute name="samplePercentage" type="xs:double" use="optional"/>
        <xs:attribute name="reportingServer" type="xs:anyURI" use="required"/>
        <xs:attribute name="reportingTime" type="xs:duration" use="optional"/>
        <xs:attribute name="reportingInterval" type="xs:unsignedInt"
use="optional"/>
        <xs:anyAttribute processContents="skip"/>
    </xs:complexType>
    <xs:simpleType name="FormatType">
        <xs:restriction base="xs:string">
            <xs:enumeration value="uncompressed" />
            <xs:enumeration value="gzip" />
        </xs:restriction>
    </xs:simpleType>
</xs:schema>
```

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
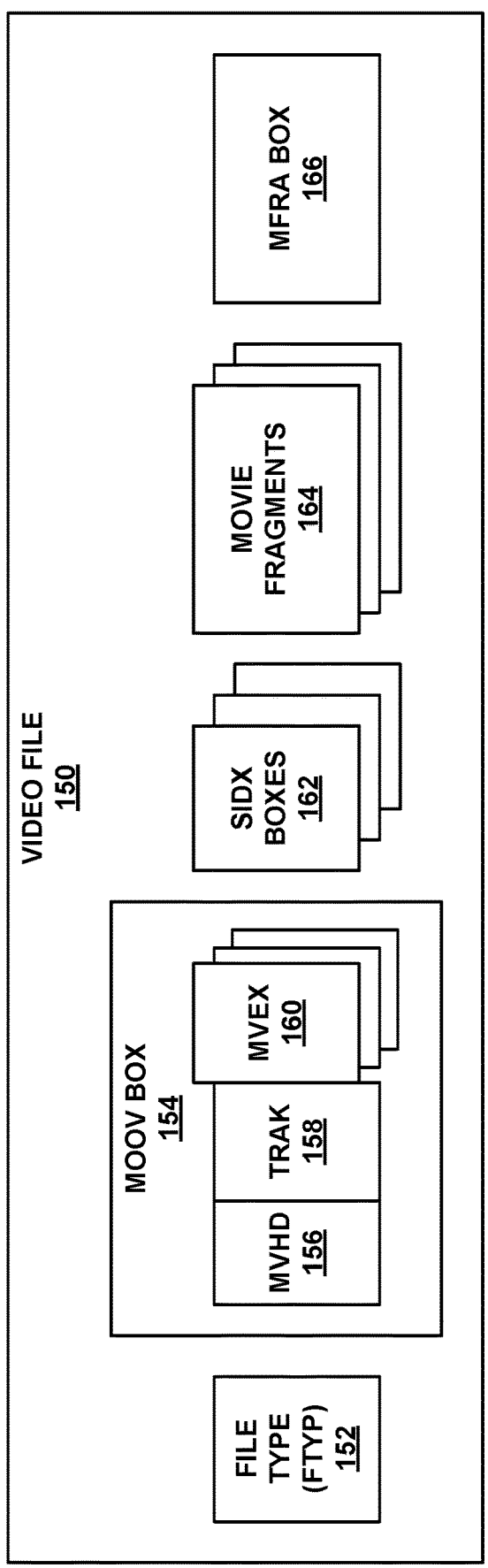
FIG. 4 is a block diagram illustrating elements of an example video file.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, IRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
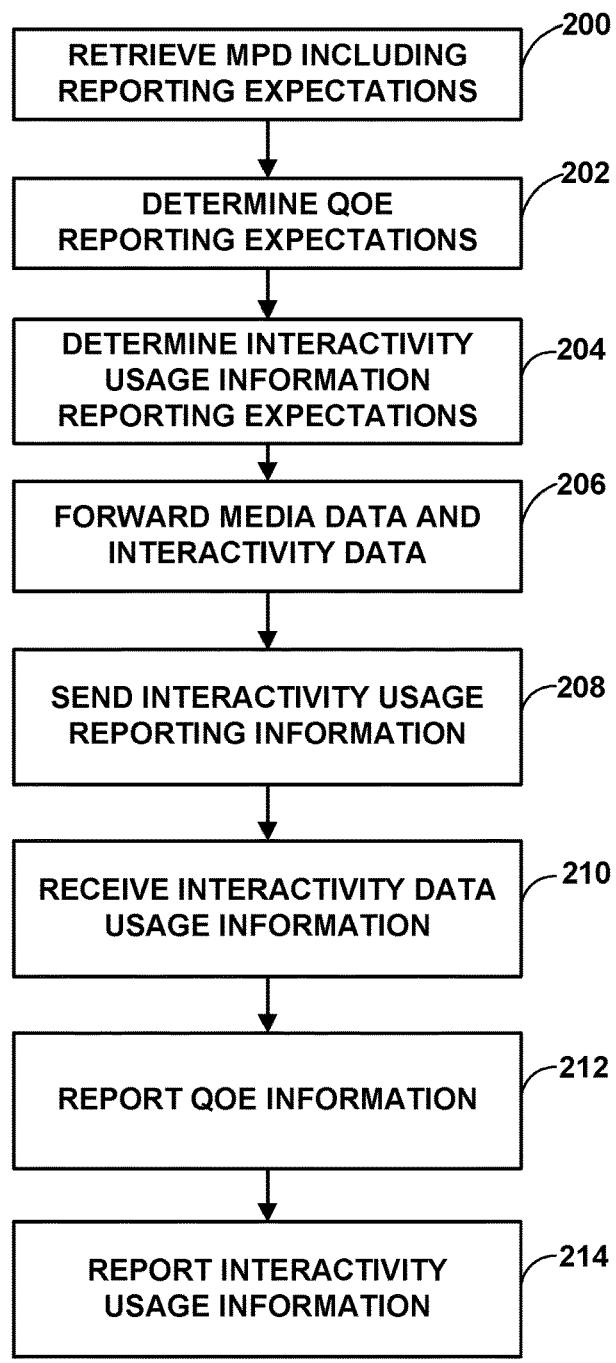
FIG. 5 is a flowchart illustrating an example method for performing techniques of this disclosure.

FIG. 5 is a flowchart illustrating an example method for performing techniques of this disclosure. The method of FIG. 5 is described with respect to DASH client 110 of retrieval unit 52 of FIG. 2, although it should be understood that other devices or units may be configured to perform this or a similar method.

In this example, DASH client 110 initially retrieves an MPD including reporting expectations (200). The reporting expectations may include, for example, expectations relating to both QoE and interactivity usage information. As discussed above, the MPD may indicate whether the QoE reports and the interactivity usage information reports are to be sent together or separately (e.g., as separate reports to the same reporting server device or separate reporting server devices). Although an MPD is described for purposes of example, it should be understood that other manifest files may be used in other examples.

Accordingly, DASH client 110 may parse the MPD to determine the QoE reporting expectations (202) and to determine the interactivity usage information reporting expectations (204). In some examples, as discussed above, the MPD may indicate a target percentage value, representing how likely a client device is to report based on a randomly generated value compared to the target percentage value. Thus, DASH client 110 may randomly generate a value and compare the randomly generated value to the target percentage value. In some examples, if the randomly generated value is equal to or less than the target percentage value, DASH client 110 determines to send a report, whereas if the randomly generated value is greater than the target percentage value, DASH client 110 determines not to send the report. If QoE data and interactivity usage data are to be reported separately, DASH client 110 may perform separate reporting determinations using distinct randomly generated values. DASH client 110 may further determine a frequency with which to send reports, a reporting format, and the like. In some examples, DASH client 110 may determine whether a group identifier (GroupID) value represents a group of client devices including client device 40 and/or DASH client 110 that are to submit reports, and determine whether or not to send the reports using the group identifier value.

DASH client 110 may also forward media data and interactivity data to media application 112 (206). In various examples, the media data and the interactivity data may be included together or separately, e.g., in the same media file but in different representations, in different files, or the like.

DASH client 110 may also send data representative of interactivity usage reporting information from the MPD to media application 112 (208). In this example, it is assumed that media application 112 also acts as an interactivity application, such as a web browser. In examples where a separate interactivity application is provided from a media player application, DASH client 110 may send the interactivity usage reporting information to the interactivity application.

DASH client 110 may then receive interactivity data usage information (210) from, e.g., media application 112. The interactivity data usage information may represent, for example, hyperlinks that were selected, radio buttons that were selected, check boxes that were selected, or other interactivity UI elements with which a user interacted. Although not shown in FIG. 5, DASH client 110 may also determine QoE information, such as, for example, which representations of an adaptation set were selected, segments that were retrieved, or the like. Accordingly, DASH client 110 may report the QoE information (212) and report the interactivity usage information (214). As noted above, in some examples, DASH client 110 may report the QoE information and the interactivity usage information together in one report, while in other examples, DASH client 110 may report the QoE information separately from the interactivity usage information.

In this manner, the method of FIG. 5 represents an example of a method including receiving, by a streaming client of a client device, a manifest file indicating reporting expectations representing data to be reported by the streaming client to a reporting server device during a media streaming session, sending, by the streaming client, data representative of the reporting expectations to an interactivity application executed on the client device, receiving, by the streaming client, interactivity usage information from the interactivity application executed on the client device, and reporting, by the streaming client, the interactivity usage information to the reporting server device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of reporting interactivity usage information while presenting streamed media data, the method comprising:

receiving, by a streaming client of a client device, a manifest file indicating reporting expectations representing data to be reported by the streaming client to a reporting server device during a media streaming session, the manifest file being separate from media files including at least one of media data or interactivity data, the manifest file not including any of the media data or the interactivity data;

sending, by the streaming client, data representative of the reporting expectations to an interactivity application executed on the client device;

retrieving, by the streaming client, one or more of the media files including the at least one of the media data or the interactivity data using the manifest file;

receiving, by the streaming client, interactivity usage information from the interactivity application executed on the client device; and reporting, by the streaming client, the interactivity usage information to the reporting server device.

2. The method of claim 1, wherein sending the data representative of the reporting expectations comprises sending the data representative of the reporting expectations to the interactivity application via an application programming interface (API), and wherein receiving the interactivity usage information comprises receiving the interactivity usage information via the API.

3. The method of claim 1, wherein the reporting expectations of the manifest file include one or more of a metrics attribute that lists the interactivity usage information to be reported, a range element indicating a time period of the streaming session during which the interactivity usage information is to be collected, a location filter element indicating a geographic area in which the interactivity usage information is to be collected, one or more streaming source filter elements identifying one or more media presentations for which the interactivity usage information is not to be collected, or a reporting element indicating a reporting method and format in which to report the interactivity usage information.

4. The method of claim 1, wherein the reporting expectations of the manifest file include one or more of an access point name (APN) element defining an access point to which the interactivity usage information is to be reported, a format element indicating a format in which to report the interactivity usage information, a sample percentage element indicating a value to which to compare a randomly generated value to determine whether to report the interactivity usage information, a reporting server element defining a uniform resource locator (URL) of the reporting server device, a reporting time element indicating a media presentation time by which to report the interactivity usage information, a reporting interval element indicating a time interval between successive transmission of reports of the interactivity usage information, or a group identifier value indicating one or more client devices that are to report the interactivity usage information.

5. The method of claim 1, wherein the manifest file comprises a Media Presentation Description (MPD).

6. The method of claim 1, wherein the reporting expectations define a randomly sampled session in which the client device is to participate and a sample percentage value in service announcement signaling.

7. The method of claim 1, wherein the reporting expectations define a targeted group session in which the client device is to participate.

8. The method of claim 7, wherein the reporting expectations define a Group Identifier (ID), and an identifier for the client device corresponds to the Group ID.

9. The method of claim 1, wherein retrieving the one or more of the media files comprises:
retrieving one or more of the media files including the media data; and
receiving one or more of the media files including interactive elements of the interactivity data,
the method further comprising presenting the media data, wherein presenting the media data comprises, during presentation of the media data, presenting the interactive elements.

10. The method of claim 9, further comprising collecting, by the interactivity application, the interactivity usage information according to user interaction with the interactive elements.

11. The method of claim 1, wherein the interactivity usage information comprises one or more of an amount of viewing by a user of interactivity content, a time duration of engagement by the user with the interactivity content, a number of click-throughs by the user of embedded links in the interactivity content, a number of purchases associated with user interaction with the interactivity content, a monetary value of the purchases, or demographic information associated with the user and interactivity usage reports.

12. The method of claim 1, wherein reporting comprises:
reporting quality of experience (QoE) information in a report to the server device; and
reporting the interactivity usage information in the report to the server device.

13. The method of claim 1, wherein reporting comprises:
reporting quality of experience (QoE) information in a first report to the server device; and
reporting the interactivity usage information in a second report to the server device, the second report being different than the first report.

14. The method of claim 1, wherein reporting comprises:
sending, by the streaming client, the interactivity usage information to a multimedia broadcast/multicast service (MBMS) client of the client device; and
reporting, by the MBMS client, the interactivity usage information to the server device.

15. The method of claim 14, wherein the MBMS client comprises an enhanced MBMS client.

16. The method of claim 14, wherein the MBMS client is included in a middleware unit of the client device.

17. The method of claim 1, wherein the streaming client comprises a Dynamic Adaptive Streaming over HTTP (DASH) client.

18. A device for reporting interactivity usage information while presenting streamed media data, the device comprising:
a memory configured to store media data; and
a processor implemented in circuitry and configured to execute a streaming client to:
receive a manifest file indicating reporting expectations representing data to be reported by the streaming client to a reporting server device during a media streaming session, the manifest file being separate from media files including at least one of media data or interactivity data, the manifest file not including any of the media data or the interactivity data;
send data representative of the reporting expectations to an interactivity application executed on the client device;
retrieve one or more of the media files including the at least one of the media data or the interactivity data using the manifest file;
receive interactivity usage information from the interactivity application executed on the client device; and
report the interactivity usage information to the reporting server device.

19. The device of claim 18, wherein the streaming client is configured to send the data representative of the reporting expectations to the interactivity application via an application programming interface (API), and wherein the streaming application is configured to receive the interactivity usage information via the API.

20. The device of claim 18, wherein the reporting expectations of the manifest file include one or more of a metrics attribute that lists the interactivity usage information to be reported, a range element indicating a time period of the streaming session during which the interactivity usage information is to be collected, a location filter element indicating a geographic area in which the interactivity usage information is to be collected, one or more streaming source filter elements identifying one or more media presentations for which the interactivity usage information is not to be collected, or a reporting element indicating a reporting method and format in which to report the interactivity usage information.

21. The device of claim 18, wherein the reporting expectations of the manifest file include one or more of an access point name (APN) element defining an access point to which the interactivity usage information is to be reported, a format element indicating a format in which to report the interactivity usage information, a sample percentage element indicating a value to which to compare a randomly generated value to determine whether to report the interactivity usage information, a reporting server element defining a uniform resource locator (URL) of the reporting server device, a reporting time element indicating a media presentation time by which to report the interactivity usage information, a reporting interval element indicating a time interval between successive transmission of reports of the interactivity usage information, or a group identifier value indicating one or more client devices that are to report the interactivity usage information.

22. The device of claim 18, wherein the manifest file comprises a Media Presentation Description (MPD).

23. The device of claim 18, wherein the streaming client is configured to:
retrieve one or more of the media files including the media data;
receive one or more of the media files including interactive elements of the interactivity data; and
present the media data and, during presentation of the media data, present the interactive elements.

24. The device of claim 18, wherein the processor is configured to execute the interactivity application to collect the interactivity usage information according to user interaction with the interactive elements.

25. The device of claim 18, wherein the interactivity usage information comprises one or more of an amount of viewing by a user of interactivity content, a time duration of engagement by the user with the interactivity content, a number of click-throughs by the user of embedded links in the interactivity content, a number of purchases associated with user interaction with the interactivity content, a monetary value of the purchases, or demographic information associated with the user and interactivity usage reports.

26. The device of claim 18, wherein the streaming client is configured to: report quality of experience (QoE) information in a report to the server device; and
report the interactivity usage information in the report to the server device.

27. The device of claim 18, wherein the streaming client is configured to: report quality of experience (QoE) information in a first report to the server device; and
report the interactivity usage information in a second report to the server device, the second report being different than the first report.

28. The device of claim 18, further comprising a multimedia broadcast/multicast service (MBMS) client, wherein the streaming client is configured to report the interactivity usage information via the MBMS client.

29. The device of claim 18, wherein the device comprises at least one of:
an integrated circuit;
a microprocessor; or
a wireless communication device.

30. A device for reporting interactivity usage information while presenting streamed media data, the device comprising:
means for receiving a manifest file indicating reporting expectations representing data to be reported by the streaming client to a reporting server device during a media streaming session, the manifest file being separate from media files including at least one of media data or interactivity data, the manifest file not including any of the media data or the interactivity data;
means for sending data representative of the reporting expectations to an interactivity application executed on the client device;
means for retrieving one or more of the media files including the at least one of the media data or the interactivity data using the manifest file;
means for receiving interactivity usage information from the interactivity application executed on the client device; and
means for reporting the interactivity usage information to the reporting server device.

31. A non-transitory computer-readable storage medium having stored thereon instructions that, when executed, cause a processor of a client device executing a streaming client to:
receive a manifest file indicating reporting expectations representing data to be reported by the streaming client to a reporting server device during a media streaming session, the manifest file being separate from media files including media data and interactivity data, the manifest file not including any of the media data or the interactivity data;
send data representative of the reporting expectations to an interactivity application executed on the client device;
retrieve one or more of the media files including the at least one of the media data or the interactivity data using the manifest file;
receive interactivity usage information from the interactivity application executed on the client device; and
report the interactivity usage information to the reporting server device.

32. The non-transitory computer-readable storage medium of claim 31, wherein the instructions that cause the processor to send the data representative of the reporting expectations comprise instructions that cause the processor to send the data representative of the reporting expectations via an application programming interface (API), and wherein the instructions that cause the processor to receive the interactivity usage information comprise instructions that cause the processor to receive the interactivity usage information via the API.

33. The non-transitory computer-readable storage medium of claim 31, wherein the reporting expectations of the manifest file include one or more of a metrics attribute that lists the interactivity usage information to be reported, a range element indicating a time period of the streaming session during which the interactivity usage information is to be collected, a location filter element indicating a geographic area in which the interactivity usage information is to be collected, one or more streaming source filter elements identifying one or more media presentations for which the interactivity usage information is not to be collected, or a reporting element indicating a reporting method and format in which to report the interactivity usage information.

34. The non-transitory computer-readable storage medium of claim 31, wherein the reporting expectations of the manifest file include one or more of an access point name (APN) element defining an access point to which the interactivity usage information is to be reported, a format element indicating a format in which to report the interactivity usage information, a sample percentage element indicating a value to which to compare a randomly generated value to determine whether to report the interactivity usage information, a reporting server element defining a uniform resource locator (URL) of the reporting server device, a reporting time element indicating a media presentation time by which to report the interactivity usage information, a reporting interval element indicating a time interval between successive transmission of reports of the interactivity usage information, or a group identifier value indicating one or more client devices that are to report the interactivity usage information.

35. The non-transitory computer-readable storage medium of claim 31, wherein the manifest file comprises a Media Presentation Description (MPD).

36. The non-transitory computer-readable storage medium of claim 31, wherein the interactivity usage information comprises one or more of an amount of viewing by a user of interactivity content, a time duration of engagement by the user with the interactivity content, a number of click-throughs by the user of embedded links in the interactivity content, a number of purchases associated with user interaction with the interactivity content, a monetary value of the purchases, or demographic information associated with the user and interactivity usage reports.

* * * * *